J. N. TEMPLE.
AIR BRAKE.
APPLICATION FILED MAR. 14, 1911.
1,002,092.
Patented Aug. 29, 1911.
2 SHEETS—SHEET 1.
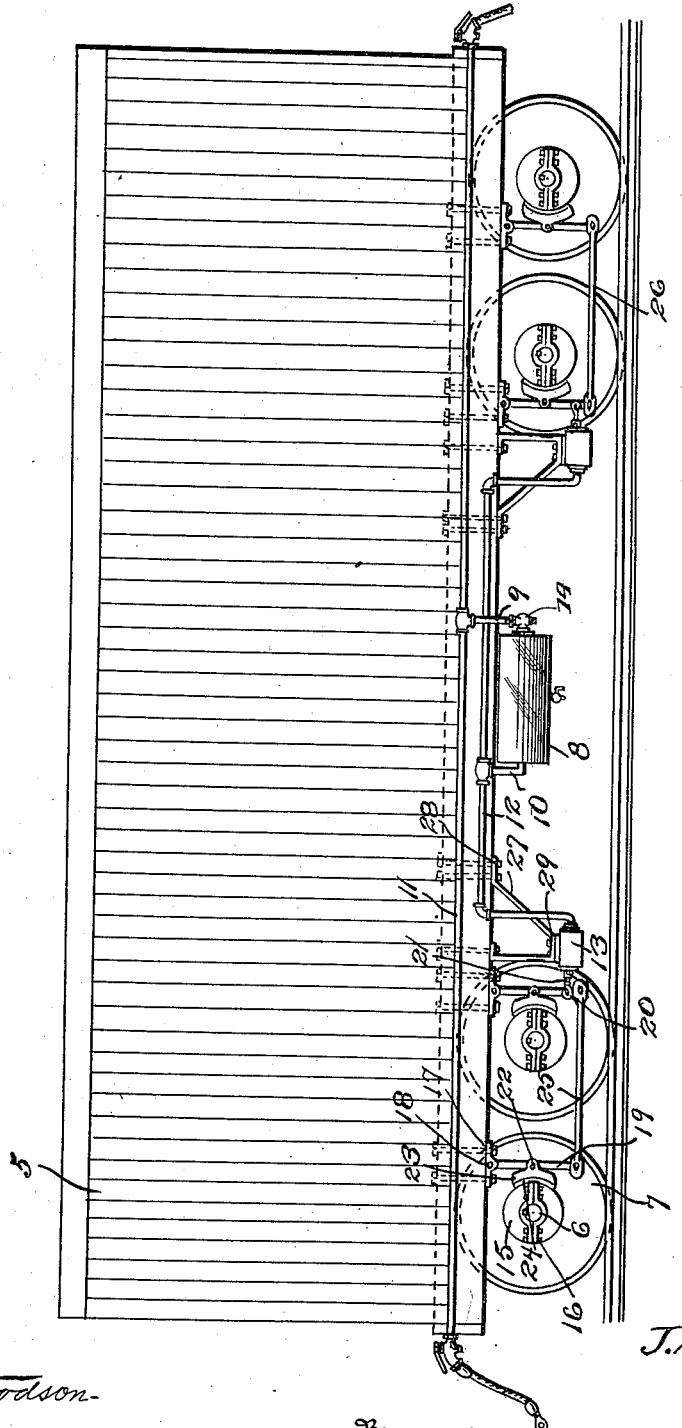
Witnesses
W. N. Woodson
Juana M. Fallin
Inventor
J. N. Temple
By
Attorneys.

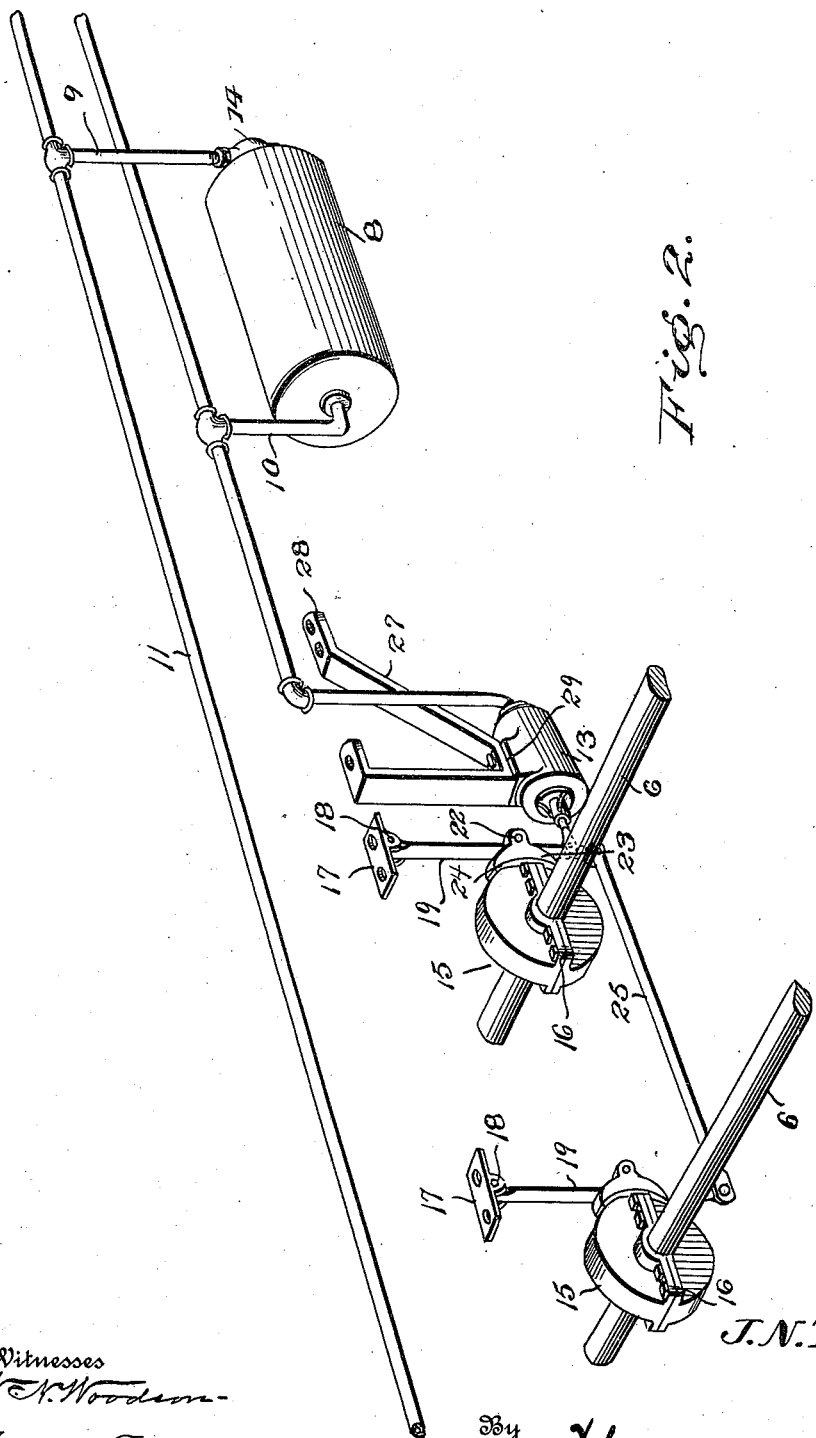

UNITED STATES PATENT OFFICE.

JOSEPH N. TEMPLE, OF UHRICHSVILLE, OHIO.

AIR-BRAKE.

1,002,092. Specification of Letters Patent. Patented Aug. 29, 1911.

Application filed March 14, 1911. Serial No. 614,461.

*To all whom it may concern:*

Be it known that I, JOSEPH N. TEMPLE, a citizen of the United States, residing at Uhrichsville, in the county of Tuscarawas and State of Ohio, have invented certain new and useful Improvements in Air-Brakes, of which the following is a specification.

This invention relates to air brakes for freight cars and other railway rolling stock. The object of the invention is to provide an air brake of simple and durable construction capable of being applied to a car or truck without changing or in any manner altering the construction thereof, and which shall act automatically to retard the movement of a train and bring the latter to a stop.

A further object is to provide an air brake including a wheel or drum for attachment to the axle of a car or truck, and a brake shoe operatively connected with the brake cylinder and adapted to frictionally engage said wheel or drum upon a reduction of the pressure in the train pipe.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a side elevation of a car provided with an air brake constructed in accordance with my invention; Fig. 2 is a perspective view of the brake mechanism with the body of the car removed in order to more clearly show the construction of the several parts.

Corresponding and like parts are referred to in the following description and indicated in all the views of the drawings by the same reference characters.

The improved air brake forming the subject matter of the present invention may be applied to freight cars, passenger cars or other railway rolling stock, and by way of illustration is shown in connection with a freight car of the ordinary construction in which 5 designates the body of the car, 6 the axles and 7 the wheels.

Arranged beneath the car, is an auxiliary air reservoir 8 having oppositely disposed branch pipes 9 and 10, one of which is connected with a train pipe 11 and the other with a longitudinally disposed conductor 12. The opposite ends of the conductor 12, are extended downwardly for attachment to brake cylinders 13, each brake cylinder being provided with a triple valve 14 of the ordinary construction.

Mounted on the axles 6, are brake drums or wheels 15, each preferably formed in two sections having their inner ends rigidly united by bolts or similar fastening devices 16. Secured to the bottom of the car above each axle 6, is a bracket 17, to which is pivotally connected at 18, the upper end of a brake lever 19, the lower end of one of the brake levers at each end of the car being pivotally connected at 20 with the plunger 21 of the adjacent brake cylinder 13, as shown.

Pivotally mounted at 22 on the intermediate portion of each brake lever 19, is a head 23, to which is bolted or otherwise secured a brake shoe 24, the latter being adapted to frictionally engage the adjacent wheel 15 and thus retard the movement of the car and bring the latter to a stop, upon a reduction of pressure in the train pipe 11. Two of the brake levers 19 are preferably arranged at each end of the car, the lower ends of the brake levers at one end of the car being connected by a rod 25 and the lower ends of the brake levers at the opposite end of the car being connected at 26.

It will here be noted that the rods 25 and 26 are disposed beneath the pivot points 20 so that when the pressure in the train pipe is reduced, the brake shoes at each end of the car will be simultaneously actuated to grip the adjacent wheels or drums 15, and upon an increase of the train pipe pressure, the springs in the brake cylinders 13 will automatically move the brake shoes 24 out of contact with said wheels or drums.

The brake cylinders 13 are suspended beneath the car by means of hangers or brackets 27 having their upper ends bent laterally to form attaching fingers 28 and their intermediate portions provided with flat bearing surfaces 29 to which said cylinders are bolted or otherwise fastened. Thus it will be seen that upon a reduction in the train pipe pressure, the brake cylinders 13 at each end of the car will tilt the adjacent levers 19 laterally and through the medium of the rods 25 and 26 force the brake shoes in contact with the adjacent wheels, and upon an increase in the train pipe pressure, the plungers of the brake cylinders will be retracted and automatically move the brake shoes out of contact with said wheels.

While the brake is shown in connection with a freight car, it will of course be understood that the same may be used with equally good results on passenger cars or other railway rolling stock.

Having thus described the invention, what is claimed as new is:

1. The combination with a car including a train pipe, auxiliary reservoir and brake cylinder, of a brake wheel secured to and mounted for rotation with the axle of the car, a lever having its upper end pivotally mounted on the bottom of the car and its lower end operatively connected with the brake cylinder, and a brake shoe pivotally mounted on the intermediate portion of said lever and movable into engagement with the wheel upon a reduction in the pressure of the train pipe.

2. The combination with a car including a train pipe, auxiliary reservoir and brake cylinders, of wheels secured to the axles of the car at each end thereof, levers pivotally mounted on the bottom of the car near each axle, one of the levers at each end of the car being operatively connected with the adjacent brake cylinder, rods forming a connection between the levers, and brake shoes pivotally mounted on the intermediate portions of said levers and movable into engagement with the adjacent wheels upon a reduction in the train pipe pressure and out of engagement with said wheels upon an increase in the train pipe pressure.

3. The combination with a car including front and rear trucks, of an auxiliary reservoir arranged between said trucks, brake cylinders spaced from the auxiliary reservoir, conductors forming a source of communication between the brake cylinders and reservoir, a train pipe connected with the reservoir, brake wheels secured to and mounted for rotation on the axles of the front and rear trucks, a lever suspended from the bottom of the car on one side of each axle, rods forming a connection between the lower ends of the levers, one of said levers being connected with the adjacent brake cylinder, and brake shoes pivotally mounted on the levers and movable into engagement with the adjacent wheels upon a reduction in the train pipe pressure.

4. The combination with a car including front and rear trucks, of hangers depending from the bottom of the car, an auxiliary reservoir arranged between said hangers, brake cylinders secured to the hangers, conductors forming a connection between the brake cylinders and auxiliary reservoir, a train pipe communicating with the auxiliary reservoir, brake wheels secured to and mounted for rotation on the axles of the front and rear trucks, brackets secured to the bottom of the car above the axles, levers having their upper ends pivotally mounted on the brackets, rods forming a pivotal connection between the lower ends of the adjacent levers, one of said levers at each end of the car being operatively connected with the adjacent brake cylinder, and brake shoes pivotally mounted on the intermediate portions of the levers and movable into engagement with the adjacent brake wheels upon a reduction in the train pipe pressure.

In testimony whereof, I affix my signature in presence of two witnesses.

JOSEPH N. TEMPLE. [L. S.]

Witnesses:
ELIZABETH RIPLEY,
A. T. ROMIG.

---

Copies of this patent may be obtained for five cents each, by addressing the "Commissioner of Patents, Washington, D. C."